L. KOENIG.
TIRE SHIELD.
APPLICATION FILED JAN. 22, 1916.

1,228,447.

Patented June 5, 1917.

Witness
Inventor
Louis Koenig
By his Attorney
Samuel E. Darby

UNITED STATES PATENT OFFICE.

LOUIS KOENIG, OF NEW YORK, N. Y.

TIRE-SHIELD.

1,228,447.  Specification of Letters Patent.  Patented June 5, 1917.

Application filed January 22, 1916. Serial No. 73,631.

*To all whom it may concern:*

Be it known that I, LOUIS KOENIG, a citizen of the United States, residing in New York, county of Bronx, State of New York, have made a certain new and useful Improvement in Tire-Shields, of which the following is a specification.

This invention relates to tire shields.

The object of the invention is to provide a tire shield which is simple in construction, economical to manufacture, and easy to apply to a tire structure.

A further object of the invention is to provide a tire shield which may serve as a non-skid attachment for tires.

A further object of the invention is to provide a tire shield composed of a series of shield elements, and means for attaching the same to a tire structure whereby any individual shield element may be removed, replaced, or repaired, without disturbing or disconnecting the remaining shield elements.

A further object of the invention is to provide a tire shield structure wherein a shield element may be applied to any particular portion of the tire to serve as a "blow-out patch."

Further objects of the invention will appear more fully hereinafter.

The invention consists in the construction, combination, location and relative arrangement of parts, all as will be more fully hereinafter set forth, as shown in the accompanying drawing, and finally pointed out in the appended claim.

Referring to the drawings,—

The same part is designated by the same reference numeral wherever it occurs throughout the several views.

Figure 2:
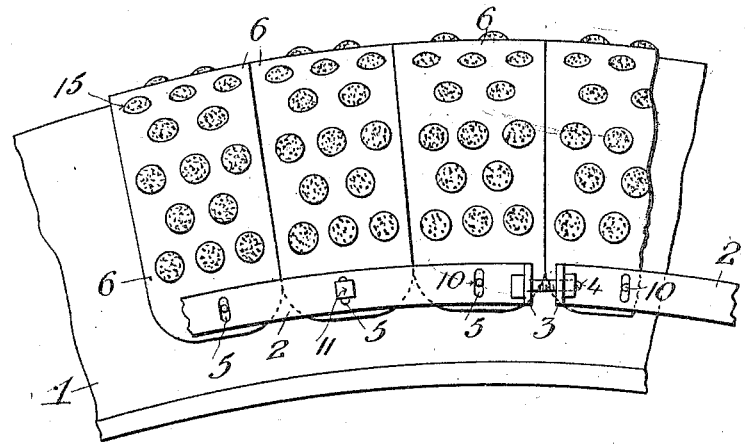
Fig. 2 is a view in side elevation of the same.
Figure 1:
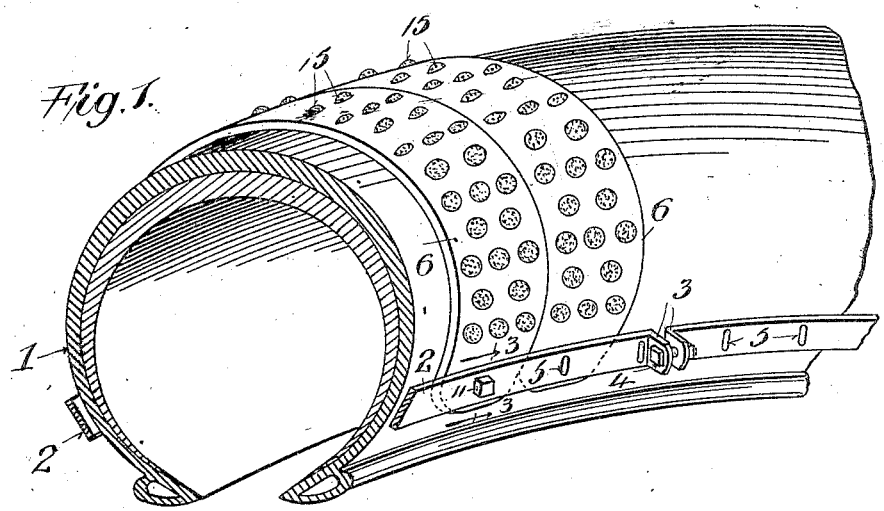
Figure 1 is a view in perspective of a portion of a tire to which is applied my invention.
Figure 3:
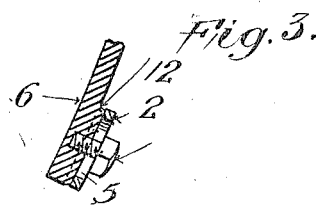
Fig. 3 is an enlarged broken detail view in section taken on the line 3—3, Fig. 1.

In carrying out the principles of my invention I propose to employ, in connection with the usual tire 1 of a vehicle, two semicircular bands or strips 2 situated preferably slightly below the center of the tire. These bands or strips may be of any desired shape or material but I find it sufficient to employ iron, steel, or other suitable metal strips of a thickness comparatively small in comparison with the width. The ends of the bands or strips 2 are formed, as shown, with angle portions 3 extending outwardly therefrom. These angle pieces or projecting lugs are provided with openings therethrough so that bolts or the like, as indicated at 4 may be inserted therein to securely fasten the strip or bands 2 together. The strips or bands are also provided with radially extending slots 5 equally spaced around the strips or bands throughout the circumference of the tire.

The shield or cover 6 may be of any desired shape, form, or material of suitable flexibility as to be adapted to bend or extend over the tire or shoe of the wheel. I find it preferable to employ a shield element of a thin metal provided at its ends with interiorly threaded holes so positioned as to be in alinement with the openings 5 in the strips or bands 2. Headed studs 11 are inserted through the openings 5 and are screwed into the holes 10 of the shield elements thereby securing the shield elements in a simple and efficient way to the bands or strips and at the same time allowing the ready removal of any particular shield element without disturbing any other shield element or the strips or bands 2.

It will be noted that the elongated openings 5 allow vertical movement therein of the studs 11, thereby allowing the necessary vertical movement for the expansion action due to the use of a pneumatic tube in the tire, and resulting or depending upon the weight of the vehicle and the degree of inflation of the tube.

If desired, and as shown, to allow a secure grip or fastening for the stud 11 to the shield elements, the ends thereof may be made thicker as shown at 12, and non-skid elements such as carborundum, or metal tread elements, indicated at 15, may be formed as part of the shield elements, or inserted, as shown in slots or recesses formed to receive the same, but my invention is not to be limited or restricted to these details.

From the foregoing, it is evident that the shield elements may be attached to a tire structure around its entire periphery, or, if desired, may be spaced any number of shield-widths apart.

A structure such as above described is especially adapted for use on tires with a defective portion, such as a "blow-out" portion or a worn portion where it is desired to lengthen the life of the tire by effectively shielding the weak portion of the tire, and making the same substantially puncture proof, while at the same time providing a non-skid attachment which eliminates the necessity of chains, and also allows easy and quick detachment of the individual puncture proof elements or shields for the purposes of repairing or replacing the same without disturbing any other shield element of the structure. It will be seen that I provide a structure the disassembled portions of which may be cheaply manufactured, and which may be readily attached to a tire.

Having now set forth the objects and nature of my invention, and having described one form of construction embodying the same, what I claim as new and useful and desire to secure by Letters Patent, is,—

A tire protector comprising a plurality of protector elements each arranged to transversely embrace a portion of the wearing tread of the tire, attaching bands positioned parallel to the tire on opposite sides thereof and provided with a plurality of spaced radially extending slots, and individually removable means passing through each of said slots for attaching each of said elements to said bands whereby each element may be removed without disturbing said bands or any other element.

In testimony whereof I have hereunto set my hand on this 19th day of January A. D., 1916.

LOUIS KOENIG.